Nov. 15, 1927.  1,648,939
D. D. EVINS
DIAGNOSTIC INSTRUMENT
Filed July 13, 1925
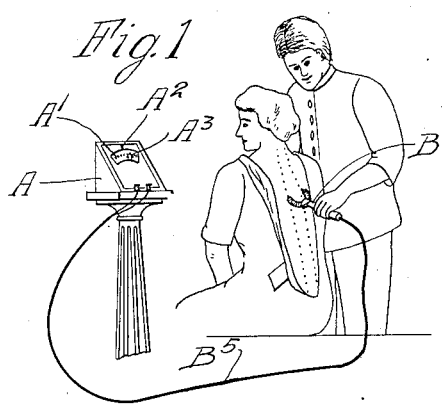
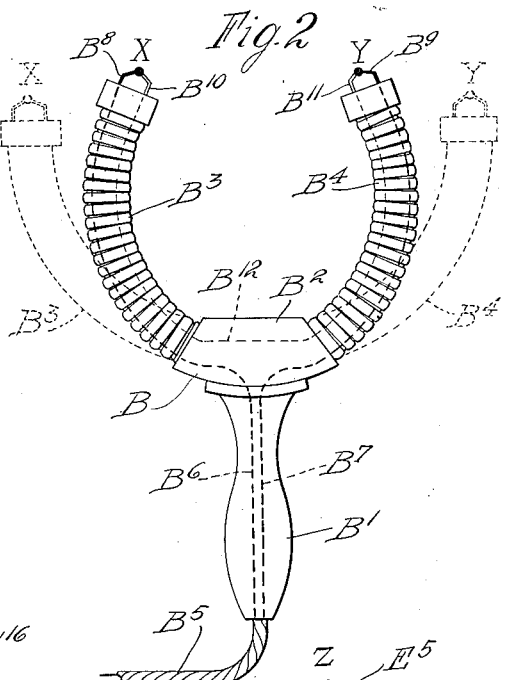
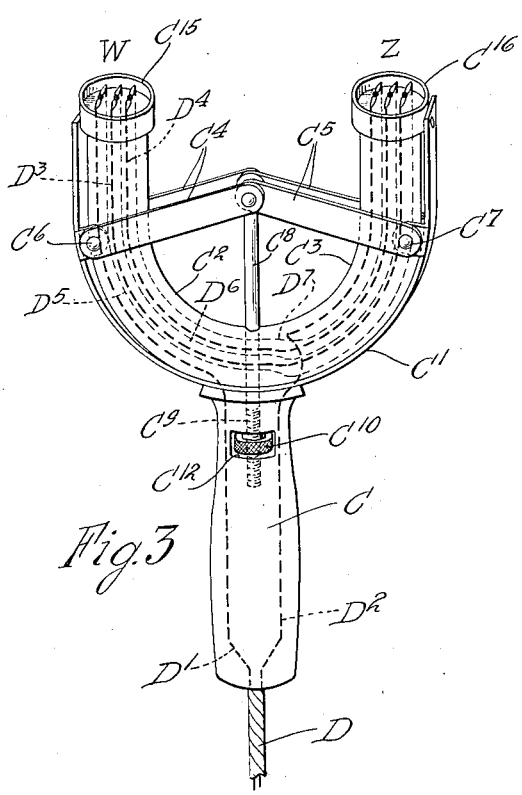
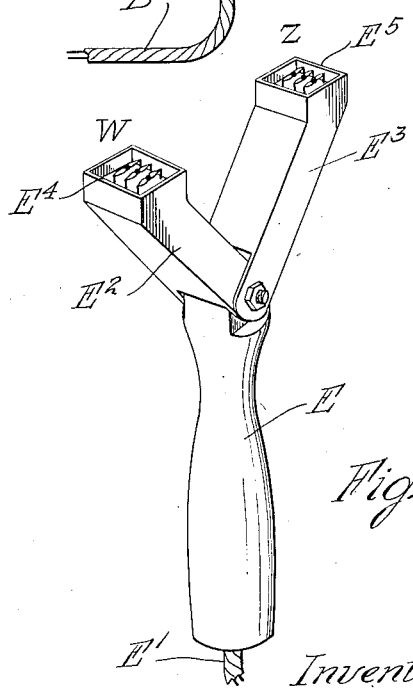
Inventor
Dossa D. Evins
by Parker & Carter
Attorneys Patented Nov. 15, 1927.

UNITED STATES PATENT OFFICE.

DOSSA DIXON EVINS, OF DAVENPORT, IOWA, ASSIGNOR OF ONE-HALF TO FRANK W. ELLIOTT, OF DAVENPORT, IOWA.

DIAGNOSTIC INSTRUMENT.

Application filed July 13, 1925. Serial No. 43,093.

My invention relates to a diagnostic instrument for detecting heated points upon the human body or other object being observed. It has for one purpose the detection of inflammation or other conditions which cause local increases in temperature, through the detection of the local differences in temperature so set up, and the location of the points so heated.

One application of my invention is the detection of inflammation or other abnormal conditions along the spine.

Other objects will appear from time to time in the course of the specifications and claims.

I illustrate my invention more or less diagrammatically in the accompanying drawings, wherein:

Figure 1 is a more or less diagrammatic perspective view of my apparatus in use;

Figure 2 is an enlarged and more or less diagrammatic view of the contacting element shown in Figure 1;

Figure 3 is a more or less diagrammatic perspective of a variant form of instrument in which the preferred wiring and connections of the contacting and indicating elements are indicated; and Figure 4 is a view of a variant form of instrument.

Like parts are illustrated by like symbols throughout the specification and drawings.

In Figure 1, I have illustrated in a diagrammatic perspective a typical application of my device. A is any indicating means, preferably a galvanometer, which is provided with a graduated dial $A^1$, associated with which is a fixed indicating pointer $A^2$ and a pointer $A^3$ adapted to move in response to the current passing through the galvanometer.

B is the contacting instrument, wherein is employed a thermocouple. It is well known that when a junction of two dissimilar metals, such as copper and constantan, to name but one example, is connected to a galvanometer, variations in temperature at the point of connection of the two metals will cause deflections of the galvanometer needle. This is due to the fact that the electrical current flowing from the junction of the dissimilar metals varies in response to changes in temperature of the junction point.

Owing to the small amounts of current generated by a single thermocouple, the preferred instrument consists of a plurality of thermocouples connected in series, whereby the effect of one thermocouple is multiplied by the number in series. This device is commonly known as a thermopile. For the sake of brevity, the two junctions of a single thermocouple, for example X and Y of Figure 2 and a plurality of junctions W and Z of Figures 3 and 4 will both be referred to as junctions.

In the use of any form of my invention in which the pair of junctions are simultaneously exposed to the body temperature, the direction of flow of the current indicates which junction is exposed to the higher temperature, and the magnitude of the deflection of the needle indicates the magnitude of the difference. For example, a focus of inflammation, or any other heat-creating focus can be detected when the instrument indicates that one of the two junctions is exposed to a higher temperature than the other. The existence of such a focus or heated spot can then be verified by comparing the temperature of the suspected area with the temperature of one or more other points upon the body.

In the form of instrument I have shown in Figure 2 I employ a hand piece $B^1$ with a cross portion $B^2$ at its upper end, and flexible arms $B^3$ $B^4$ attached to the ends of the cross piece $B^2$. At the ends of each arm are the junctions X and Y. $B^5$ is any suitable conduit or cable enclosing the copper leads $B^6$ $B^7$ which extend to the copper members $B^8$ $B^9$ respectively of the two junctions. $B^{10}$ $B^{11}$ are the opposite members of the junctions, for example of constantan, and $B^{12}$ is a constantan wire connecting them. It will be understood that Figure 2 is a diagrammatic illustration and that in practice the junctions do not always forwardly project from the surface of the contacts.

Figure 3 illustrates a variant form of my device in which C is the hand piece. $C^1$ is a leaf spring secured to the hand piece midway its length. $C^2$ $C^3$ are flexible arms or conduits, which may be of rubber or any other suitable material, which sheath the wiring of the thermopile. $C^4$ $C^5$ are links connected at their outer ends as at $C^6$ $C^7$ to the spring $C^1$ and pivoted to each other at their inner ends and to the longitudinally movable pin $C^8$ the opposite screw-threaded end of which $C^9$ is controlled, for example by the nut $C^{10}$ which is fixed against longitudinal movement in the hand piece C, but which is exposed to the fingers of the operator for example by the aperture $C^{12}$. In place of the single thermocouple of Figure 2, I illustrate in Figure 3 a thermopile composed of a plurality of thermocouples. D is any suitable cable or wrapping enclosing the copper wires $D^1$ $D^2$ which close the thermopile circuit. It will be understood that the heavier wires $D^3$ $D^4$ indicate copper leads and that the lighter wires $D^5$ $D^6$ $D^7$ are of constantan or other suitable material, the copper and the other metal alternating in the thermopile.

Figure 4 illustrates a further variant form, the wiring of which will be understood to be the same as that of Figure 3. E is a hand piece to which leads the cord $E^1$. Pivoted to the outer end of the handle E are the arms $E^2$ $E^3$ which serve to sheath or protect the wiring of the tremopile. Each arm terminates in a contacting member comprising the rims $E^4$ $E^5$, in this figure illustrated as square as contrasted to the round rims $C^{15}$ $C^{16}$ of Figure 3.

It will be understood that in the instrument as actually operated the two contacting members each consist of a rim enclosing what becomes a dead air space when the rim is applied to the body of the patient. The junction elements are positioned in substantially the plane of the rim and the rim therefore serves not only to protect the delicate connections and to provide an insulating dead air space about them, but also serves properly to position them in relation to the body.

It will be realized that while I have illustrated a practical and operative device that nevertheless many changes may be made in the shape, number and disposition of parts without departing from the spirit of my invention. I therefore wish my description and drawings to be taken as in a broad sense illustrative, rather than as limiting me to my specific showing.

The present application is a continuation in part of my application No. 733.872 filed August 25, 1924, which in turn is a division of my application 687,151, filed January 18, 1924.

The use and operation of my invention are as follows:

Many medical and surgical methods have been evolved for correcting or curing diseased conditions in the body. My instrument, herein described and claimed, is not used for curative purposes, and has for its purpose merely to detect or locate such affected points on the body as are evidenced by a raising of the temperature of the body at the affected point. The affected point so located may be treated by any preferred means and processes as seen fitting to the individual in charge of the case. It is known that inflammations of the body, from whatever cause they may arise, generally tend to raise the temperature of the body at the point of inflammation. The fever of a wound, or even a small scratch, if it is at all infected, is easily detected by contact. The difference in temperature between the part of the body immediately adjacent the cut and the unaffected parts of the body is such as to be easily perceptible to the finger tips. Subcutaneous infections do in general give rise to similar local variations of temperature which are, of course, harder to detect. My instrument has for object to permit the ready detection of such points on the body as have had their temperature raised by local inflammations or abnormal conditions. It will be understood that its use does not relate to the explanations or the cure of the conditions or of the affected locations thus detected.

In the use of my instrument, I preferably employ a pair of temperature detecting elements secured to a temperature indicating or recording device. In the preferred form of instrument I expose a pair of thermocouple junctions at each prong of a forked hand piece and connect the two junctions with a galvanometer, the needle of which deflects toward the junction which is exposed to the higher temperature. Working along the spine, for example, with the temperature detector instrument, the operator can instantly determine the relative temperature of the opposite sides of the same vertebra or of adjacent vertebrae. Working progressively up and down the spine, the operator can quickly locate any heated areas that may be present. An affected nerve, if, as is frequently the case, it overheats the part of the body through which it runs, can be traced by a series of comparative observations of the temperature of the path of the nerve with the temperature of the body on either side of it. In case but one detector is used, it is necessary to make separate observations of the temperature of the parts of the body compared, thus doubling the number of observations and making necessary a computation of the difference. When the double instrument is used, the hotter of any two spots simultaneously observed is automatically indicated. However, the process is essentially the same.

In the employment of my instrument, a particularly efficient method of determining whether or not a local temperature causing disturbance exists, is to compare the temperature of a given spot on one side of the median line of the body with the temperature of a like spot on the opposite side of the line. If one of the two spots is substantially hotter than the other, there is an inference of an abnormal local temperature, and therefore of some condition causing it. If the corresponding points are at a like temperature, a comparative check with some other part of the body will indicate whether both parts are at normal temperature or whether both are abnormal.

My instrument is also of value as a check in treating affected parts of the body. Where an over-heating or an inflammation has been determined to exist and where some treatment has been given to the affected point or the patient, no matter what the treatment may be, my instrument is available as a check to indicate whether or not the treatment has affected the abnormal heated point or points. When my instrument is so employed a comparison is made not merely between the affected spot and other spots on the surface of the body, but between the temperature of the affected spot before and after treatment.

I claim:

1. In a contactor for an indicating apparatus of the class described, a hand piece, a pair of arms in adjustable relation therewith, and thermocouple junctions located adjacent the end of each arm.

2. In a contactor for an indicating apparatus of the class described, a hand piece, a pair of flexible arms associated therewith, and thermocouple junctions located adjacent the end of each arm.

3. In a contactor for an indicating apparatus of the class described, a hand piece, a pair of adjustable arms secured thereto, and means for controlling the adjustment of said arms.

4. In an electrical diagnostic instrument, a hand piece, a pair of heat sensitive members adjustably positioned thereupon, and means for positively controlling their adjustment.

5. In a diagnostic instrument, a hand piece, a pair of flexible arms secured thereto, and a heat sensitive means located upon each such arm.

6. In a diagnostic instrument, a hand piece, a pair of adjustable arms secured thereto, and a heat sensitive means secured upon each such arm.

7. In a diagnostic instrument, a hand piece, a leaf spring positioned adjacent one end of said hand piece, flexible arms secured to said leaf spring, thermocouple junctions located in each arm and electrical connecting means between such indicating means and thermocouple junctions, and means for controlling the flexure of said spring, comprising links pivoted at one end to said spring and at the other end to each other and a member adapted to move the common pivot point of said links transversely of the length of said links.

8. In a diagnostic instrument, a hand piece, a leaf spring positioned adjacent one end of said hand piece, flexible arms secured to said leaf spring, thermocouple junctions located in each arm, indicating means adapted to indicate fluctuations of currents from said junctions, and electrical connecting means between such indicating means and thermocouple junctions, and means for controlling the flexure of said spring, comprising links pivoted at one end to said spring and at the other end to each other and a member adapted to move the common pivot point of said links transversely of the length of said links, comprising a pin co-axial with the handle, one end of said pin terminating at the pivot point of said links, the other end axially penetrating the handle, and means for imparting longitudinal movement to it in relation to said handle.

9. In a diagnostic instrument, a hand piece, a leaf spring positioned adjacent one end of said hand piece, flexible arms secured to said leaf spring, thermocouple junctions located in each arm, indicating means adapted to indicate fluctuations of currents from said junctions, and electrical connecting means between such indicating means and thermocouple junctions, and means for controlling the flexure of said spring, comprising links pivoted at one end to said spring and at the other end to each other and a member adapted to move the common pivot point of said links transversely of the length of said links, comprising a pin co-axial with the handle, one end of said pin terminating at the pivot point of said links, the other end axially penetrating the handle, and means for imparting longitudinal movement to it in relation to said handle, comprising a nut fixed against longitudinal movement in said handle and adapted to engage the inner end of said pin, such end of said pin being screw threaded.

Signed at Davenport county of Scott and State of Iowa, this 9th day of July, 1925.

DOSSA DIXON EVINS.